United States Patent Office 3,472,910
Patented Oct. 14, 1969

3,472,910
CATALYTIC SYNTHESIS OF LINEAR ALPHA OLEFINS
Dimitrios V. Favis, Sarnia, Ontario, Canada, assignor to Esso Research and Engineering Company, a corporation of Delaware
No Drawing. Filed May 25, 1965, Ser. No. 458,745
Int. Cl. C07c 3/18; B01j 11/84
U.S. Cl. 260—683.15          11 Claims

ABSTRACT OF THE DISCLOSURE

Ethylene is polymerized in an aromatic hydrocarbon diluent in the presence of a three component, and preferably a four component catalyst system consisting essentially of (1) alkyl and alkyl halides of Groups I, II and III metals, e.g., aluminum trialkyl, (2) inorganic halides of Group IV–B, V–B, and VI–B and VIII metals of the Periodic Table, e.g., $TiCl_4$, (3) a tertiary alkyl halide or an alkyl halocyclopentane and preferably, in addition, (4) a metallocene, e.g., ferrocene. These catalyst systems, with specified concentrations and reaction conditions, result in the high selectivity production of linear alpha olefins.

---

This invention relates to a novel method of preparing linear alpha olefins. More particularly, this invention relates to a novel process for polymerizing ethylene to obtain a low molecular weight liquid linear alpha olefin product. In a preferred embodiment, this invention relates to a novel process for catalytically synthesizing liquid linear alpha olefins in a $C_{10}$ to $C_{22}$ range for detergent applications.

It is well known in the prior art that normal alpha olefins can be synthesized from ethylene by the so called aluminum alkyl growth, Ziegler reaction. This reaction is stoichiometric in that, at most, only 3 molecules of olefin per molecule of aluminum alkyl are obtained. While the aluminum alkyls may be physically or chemically recovered in situ, during the reaction (Belgian patent 625,-002, U.S. Patent 3,160,672) or recycled by the utilization of displacement and distillation techniques, so that their consumption is reduced to catalytic amounts, the economics of such processes for producing olefins have prohibited their commercial acceptance. Various attempts have therefore been made to produce n-1-olefins from ethylene using Ziegler type catalytic oligomerizations. U.S. Patents 3,097,246 and 3,136,824 for example, described modified catalyst systems which may be employed to obtain telomerization of ethylene and aromatic compound thereby forming alkylated aromatic products.

It has now been discovered that by further modification of the catalyst systems described in the above-mentioned patents as well as by critical control of reaction conditions such as pressure and catalyst concentration, it is possible to catalytically synthesize linear alpha olefins from ethylene. Specifically, it has now been discovered that the utilization of ferrocene as an additional catalyst modifier and the careful control of ethylene concentration by regulation of the pressure, in the presence of selected diluents, results in a polymerization process which is highly selective for the production of low molecular weight linear alpha olefins.

The catalyst system of this invention comprises (1) an alkyl compound or monohalogen-substituted alkyl compound of a metal of Groups I to III of the Periodic Table; (2) a halide of a transition metal of Groups IV–B, V–B, VI–B and VIII of the Periodic Table; (3) an alkyl halocycloalkane; and ferrocene.

The metal alkyl components of the present catalyst system have the following general formula: RR′R″Me wherein R is a phenyl or alkyl group having 1 to 24 carbon atoms, either straight or branched chain. Preferably, R is a lower alkyl and more preferably a $C_1$ to $C_6$ alkyl. Where the valence of the metal is two or greater, then R′ is the same as R or may be a halogen chosen from I, Br and Cl or H. R′ may represent nothing in the event the metal has a valence of only one. Where the valence of the metal is three R″ will have the same definition as either R or R′. The "Me" portion of the metal alkyl component is a metal of Groups I to III of the Periodic Table such as Li, Na, K, Mg, Ca, Sr, Va, Al, Ga, and In; with Al preferred. The preferred metal alkyl component of the catalyst system is triethylaluminum although diethylaluminum chloride and ethylaluminum dichloride have also been found to be highly advantageous. Other metal alkyl compounds which may be employed include dipropylaluminum chloride, triisobutylaluminum, diethylaluminum hydride, ethylbutylhexylaluminum, diethylaluminum chloride, dibutylaluminum chloride and ethylaluminum dichloride. Many other metal alkyl compounds of this general class are also employable with good results.

The metal halide component of the catalyst system of this invention has the following general formula: $MX_a$ where M equals a transition metal of Groups IV–B, V–B, VI–B and VIII of the Periodic System such as Ti, Zr, V, Cr, Mo, W, and Fe, preferably Ti; X equals a halide, preferably Cl; and small $a$ equals valence of M, e.g. 2 to 4. The preferred compound is titanium tetrachloride. Examples of other metal halide which may be employed include $ZrCl_4$, $VCl_4$ and $CrCl_3$.

The third component of the catalyst is an alkyl halocyclopentane having the formula:

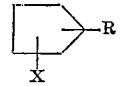

where R equals a straight or branched chain alkyl group having from 1 to 10 carbon atoms, preferably methyl; and X equals a halogen, preferably Cl. The preferred compound is methylchlorocyclopentane. Tertiary chlorides, i.e.

wherein R, $R_1$ and $R_2$ represent hydrocarbon radicals such as methyl, ethyl, propyl, phenyl, etc. are moderately effective and may be employed in lieu of the alkylhalocyclopentane if desired.

The fourth component of the catalyst system of this invention is a ring metal, "sandwich" type of organo metallic compound. The preferred compound is ferrocene having a formula $(C_5H_5)_2Fe$. Examples of other compounds in this class include $Cp_2Ti$, $Cp_2Cr$, $Cp_2Co$, $Cp_2Ni$, $Cp_2TiCl_2$ and other metallocenes preferably those having a valency changing metal, where Cp is a cyclopentadiene based group, e.g. $(C_5H_5)$.

The optimum mole ratio of the metal alkyl compound to metal halide is inter-related with the molar ratio of the modifier to metal alkyl. However, it should be no lower than 1.0 and preferably higher than 1.2 and of a level providing a polymeriaztion reaction having a reasonable degree of reactivity. It should be emphasized that optimum ranges of the molar ratio of these components are also inter-related with the concentration of the metallocene, i.e. ferrocene. Low metal-alkyl to metal halide ratios can be employed provided that higher concentrations of metallocene are also used. In adidtion, the quantity of alkylhalocyclopentane must be maintained lower than 0.99 mole per mole of alkyl radical of the metal alkyl compound, and preferably between 0.3 and 0.7. The molar ratio of metallocene, i.e. ferrocene, component over the triethylaluminum will depend on the ratio of titanium tetrachloride; however it should be normally ranged from 0.001 to 1.0 and preferably between 0.02 to 0.2. The four component catalyst may be employed in amounts corresponding to less than 0.2 gram of triethylaluminum per 100 grams of total reaction product. Since catalyst and ethylene concentrations are inter-related critical variables of the reaction optimum amounts can further be determined experimentally with a reasonable degree of expectancy. Normally, the preferred amount of total four component catalyst is in the range of 0.1 to 2.0 grams per 100 grams of reacted ethylene, or the same, of total reaction products.

Ethylene is unique in the instant invention that other olefins do not respond to give similar products. Ethylene feeds containing minor amounts of other olefins may be used provided that the extent of copolymerization does not significantly decrease product linearity.

The process of this invention is normally carried out in the presence of an inert diluent. The effect of diluent on the reaction system is critical since ethylene adsorbability, molecular weight and type of olefin product are affected by the choice of diluent. Aromatic diluents such as benzene, xylene and toluene are preferred diluents, the latter two being most preferred. Paraffin and cycloparaffin solvents exhibit poor ethylene adsorbability and yield reaction products predominantly composed of high molecular weight prolymers.

The reaction conditions are a critical feature of this invention. As stated previously in this application, the ethylene concentration, as represented by the ethylene pressure, in the process must be controlled within critical limits if high yields of linear alpha olefins in the desired molecular weight range are to be obtained. Thus, the ethylene pressure will normally be maintained between 0 and 2,000 p.s.i.g., preferably 100 to 500 p.s.i.g., e.g. 350. The upper limit of pressure is critical since the reaction at pressures higher than 2,000 p.s.i.g. has the tendency of producing large quantities of high molecular weight polyethylenes. Reaction temperatures will normally be maintained between $-130°$ and $130°$ F., preferably $-40°$ to $+70°$ F. Reaction times are not particularly critical when operating under the other preferred conditions of reaction and will normally be in the range of 0.1 to 15 hours, preferably 1 to 5 hours. However, olefin type distribution may be somewhat effected by reaction time, longer reaction times resulting in interactions to form type III olefins. Reaction times in the range of 0.1 to 3 hours, e.g. 1 hour or less are particularly preferred when pressures lower than 100 p.s.i.g. are employed.

In a typical embodiment of this invention, the catalyst components, in proper proportion, are introduced into a reactor containing an appropriate diluent. The catalyst components are thoroughly mixed and the reaction system is brought to the proper temperature of reaction. Ethylene, under the appropriate pressure, is introduced into the reactor for a time sufficient to complete the polymerization reaction. Upon completion of the reaction, the reaction mixture may be treated with water to destroy the catalyst. The removal of ferrocene from the hydrocarbon phase may be accomplished by treatment of the hydrocarbon phase with any of various oxidants such as HCl, $H_2O_2$ and $HNO_3$ or by adsorption with silica gel, clay and the like. The hydrocarbon phase containing the decomposed catalyst and adsorbent is filtered and the filtrate is thereafter distilled to remove diluent. The product may then be further distilled to obtain the desired smear of product olefins. Thus, for example, the product boiling in the range of $400/700°$ F. ($C_{12}$ to $C_{22}$) may be recovered by such fractionation and thereafter further treated, for example by sulfonation, to produce useful detergents.

The invention will be further understood by the following illustrative examples.

EXAMPLE 1

1,000 ccs. of dry toluene was placed in a conventional A.M. reactor blanketed with nitrogen. About seven grams of triethylaluminum, dissolved in four parts of normal heptane, was introduced into the reactor. Monochlorinated methylcyclopentane was added as a modifier to the system at a mole ratio to the triethylaluminum of 1.83. After the reaction of these two components was completed, one gram of ferrocene, corresponding to a mole ratio over the triethylaluminum of 0.16, was added to the system. After stirring for about five minutes titanium tetrachloride was added at a mole ratio to triethylaluminum of 0.50. The above operations were carried out at about 70° F. The system was stirred again for about five minutes and then heated to about 120° F. and kept at this level for about 20 minutes. Thereafter, the reaction temperature was lowered to 70° F. Ethylene was introduced into the system at a rate of about 1.85 gm./min. and the reaction was run for about 60 minutes. Upon completion of the reaction, water was added to the system to destroy the catalyst. The hydrocarbon phase was filtered to remove solids. The filtrate was distilled to remove toluene. The products were then distilled to remove materials boiling below 700° F. The distribution in weight percent on total reaction products is shown in Table I. Analysis was carried out by gas chromatography and infrared spectrography.

EXAMPLE 2

In order to demonstrate the extent of the effect of the ferrocene component on this reaction, another experiment was carried out under the same conditions as those of Example 1 except that no ferrocene was used. The results in Table I show that this reaction did not produce olefins.

EXAMPLE 3

The reaction diluent also has an important effect on the product distribtuion and the type of olefins produced. To demonstrate this, another experiment was carried out using the same conditions as those of Example 1, except for the use of normal heptane instead of toluene as the diluent. From the results shown in Table I, it will be seen that this reaction gave 25 wt. percent of liquid products boiling above 215° F. The balance of 75 percent was high molecular weight solid polyethylenes. It is particularly important to note that infrared spectroscopy and gas chromatography indicated the type of olefins to be exclusively of the alpha type. Although the selectivity of the reaction in $C_8$ to $C_{20}$ olefins was poor, about 14 wt. percent on total reaction products, this experiment demonstrates that both type of olefin and product distribution, greatly depend on type of diluent used.

EXAMPLE 4

It was of interest to learn whether or not ferrocenes can modify a typical Ziegler catalytic system, such as that of triethylaluminum-titanium tetrachloride, to produce normal alpha olefins. For this reason, an experiment was carried out under the same conditions as those of Example 1 but without monochlorinated methylcyclopentane modifier. From the results in Table I, it will be seen that the reaction gave only 20 wt. percent of liquid products, the balance being high molecular weight solid polyethylenes. Infrared spectroscopy indicated that the above liquid products of the reaction were alkylated toluenes. Thus, it was demonstrated that modification of the system, with the proper chlorocarbon modifier, was necessary for a satisfactory selectivity in both product distribution and olefin formation.

The results of Examples 1 to 4 are summarized in Table I below.

TABLE I

| | Example | | | |
|---|---|---|---|---|
| | 1 | 2 | 3 | 4 |
| Reference run A.M | 275 | 279 | 283 | 280 |
| Conditions: | | | | |
| Ferrocene/triethylaluminum mole ratio | 0.16 | Zero | 0.16 | 0.16 |
| Cl-MCP(²)/triethylaluminum mole ratio | 1.83 | 1.83 | 1.83 | Zero |
| Titanium tetrachloride/triethylaluminum, mole ratio | 0.50 | 0.50 | 0.50 | 0.50 |
| Reaction temperature, °F | 70 | 70 | 70 | 70 |
| Type of diluent | Toluene | Toluene | n-Heptane | Toluene |
| Product distribution, wt. percent on total: | | | | |
| Light products B.P. <700° F | 76.0 | 60.0 } | 25.0 | 20 } |
| Heavy products B.P. <700° F | 24.0 | 40.0 | | |
| Solid polyethylenes | Tr. | Tr. | 75.0 | 80 |
| Total $C_8$-$C_{20}$ olefin | 45.0 | Nil | ¹ 14.0 | |
| Total $C_8$-$C_{20}$ alpha olefin | 36.5 | Nil | | |
| Total $C_7$-$C_{20}$ Type II olefin | 3.9 | Nil | | |
| Total $C_8$-$C_{20}$ Type III olefin | 4.6 | Nil | | |
| Total $C_{12}$-$C_{20}$ Olefin | 38.4 | Nil | | |
| Total $C_{12}$-$C_{20}$ Alpha type | 22.0 | Nil | | |
| $C_8$-$C_{20}$ Unknown structure probably olefin | 13.0 | | 9.0 | |
| Total $C_8$-$C_{26}$ Alkylate | 18.3 | 60 | | 20 |

(¹) $C_8$-$C_{26}$.
(²) Cl-MCP indicates monochlorinated methylcyclopentane.

EXAMPLE 5

A further series of experiments similar to Example 3 were carried out for the purpose of determining the effect of various diluents on the reaction system. A four component catalyst system consisting of triethylaluminum, monochlorinated methylcyclopentane, titanium tetrachloride and ferrocene was employed in these experiments. The results, summarized in Table II, clearly indicate the superiority of aromatic diluents in the production of olefins.

"nickel effect" arising from stainless steel surfaces. The molar ratios of the modifier, titanium tetrachloride, and ferrocene to triethylaluminum were 1.820, 0.840, and 0.232 respectively. The reaction time was 4 hours. Input and unreacted ethylene were measured to determine adsorbability. The catalyst was prepared at 70° F. without subsequent preheating. The reaction was carried out at atmospheric pressure. After termination the reaction mixture was washed with water to destroy catalyst, remove water soluble decomposition components and obtain a

TABLE II

| | Diluent | Reaction temp., °F | Ethylene adsorbability | Product Distribution, wt. percent | | | Bromine No. of the <700° F. B.P. fraction |
|---|---|---|---|---|---|---|---|
| | | | | B.P.<700° F. | B.P.700° F. | Solids | |
| Experiment AM #: | | | | | | | |
| 277 | Benzene | 70 | Good | 39 | 56 | 5 | 68 |
| 257 | Toluene | -30 | do | 90 | 10 | Tr. | 67 |
| 391 | Xylenes | 20 | do | 65 | 30 | 5 | 70 |
| 283 | n-Heptane | 70 | Poor | 33 | 33 | 67 | |
| 397 | Cyclopentane | 0 | Very poor | | | | |
| 287 | Methylcyclopentane | 70 | Poor | (Mostly high m.w. polymers) | | | |
| 396 | Cyclohexane | 50 | Medium | do | | | |

EXAMPLE 6

A series of experiments aiming at the optimization of the reactions carried out, generally, under the conditions of the previous examples led to the results shown in the following tabulation:

TABLE III

| | Experiment AM | | |
|---|---|---|---|
| | 440 | 389 | 391 |
| Reaction temperature, °F | -10 | 0 | +20 |
| Product distribution, wt. percent on total reaction product: | | | |
| i/400° F. boiling range mono-olefin, $C_6$/$C_{10}$ | 46 | 34 | 18 |
| 400/700 boiling range mono-olefin, $C_{12}$/$C_{22}$ | 45 | 47 | 50 |
| 700° F. plus boiling range mono-olefin, $C_{22}$ | 9 | 19 | 28 |
| Xylene insoluble polyethylenes | Tr. | Tr. | Tr. |
| Type of olefin in the 400/700° F. fraction, mole percent: | | | |
| Type I | 46 | 44 | 44 |
| Type II | 12 | 18 | 18 |
| Type III | 42 | 38 | 38 |

Minor amount of Type IV and V olefins might also be present. The reactions were carried out in histological xylene, roughly composed of 6% ortho-, 63% meta-, and 31% para-, under various temperatures. Glass-Teflon coated reactor internal surfaces were used to eliminate nearly neutral hydrocarbon phase. The latter was filtered to remove small amounts of solid products, dried, and distilled under vacuum to recover products and diluent. The overall reaction product was divided in four parts as follows: Materials boiling below 400° F.; the 400/700° F. boiling range fraction roughly corresponding to $C_{12}$ to $C_{22}$ carbon range, the 700° F. plus boiling range product, and the xylene insoluble solid high molecular weight polyethylenes. From the results shown in the above table it will be seen that at −10° F. the reaction gave light olefins having a number of carbon atoms not higher than 22, in 91 wt. percent yield on total reaction products. This was decreased to 82 and 65 wt. percent in favor of heavier products when the reaction was carried out at 0 and 20° F. respectively. It will also be seen that the yield of $C_{12}$ to $C_{22}$ olefin remained practically constant throughout amounting to about 45 to 50 wt. percent on total reaction product. The olefin type distribution of the $C_{12}$/$C_{22}$ fraction was 44 to 46 mole percent Type I, 12 to 18 mole percent of Type II, and 38 to 42 mole percent Type III. Minor amounts of Type IV and V olefins were also present.

EXAMPLE 7

Using the conditions under which the reactions of Example 6 were carried out, the effect of ferrocene was again tested and the results are shown in the following tabulation:

TABLE IV

|  | Experiment AM # | |
| --- | --- | --- |
|  | 404 | 391 |
| Ferrocene | No | Yes |
| Product distribution, wt, percent on total: |  |  |
| i/400° F. boiling range fraction | 30 | 22 |
| 400/700° F. boiling range fraction | 47 | 46 |
| 700° F. plus fraction | 23 | 27 |
| Xylene insoluble polyethylenes | Tr. | 5 |
| Composition of the 400/700° F. fraction: |  |  |
| Aromatic alkylate, vol. percent | 20 | <5 |
| Bromine number | 76 | 74 |
| Olefin type distribution, mole percent: |  |  |
| Type I | 22 | 45 |
| Type II | 29 | 16 |
| Type III | 49 | 39 |

The data were obtained by carrying out reactions in presence and absence of ferrocene. It will be seen that the reaction in absence of ferrocene gave a $C_{12}/C_{22}$ fraction containing more aromatic alkylate, 20 vs. 5 vol. percent, less Type I olefins, 22 vs. 45 mole percent, more Type II olefins, 29 vs. 16 mole percent, and more Type III olefins, 49 vs. 39 mole percent, than that obtained by the reaction carried out in presence of ferrocene. The differences were not as great as those demonstrated by Example 2 because incipient acidity was substantially reduced by using glass or Teflon internal reactor surfaces replacing those of stainless steel.

EXAMPLE 8

A series of experiments was carried out to determine the effect of reaction pressure on the system of this invention. The reaction temperature in each case was maintained at 0° F. The $TiCl_4/Et_3Al$ and ferrocene/$Et_3Al$ ratios were varied between 0.84 to 0.502 and 0.232 to 0.116 respectively in these runs. However, experience indicates that these variations should not effect the olefin-type concentration. The results, summarized in Table V below, indicate the effect of pressure on the reaction. Product analysis was accomplished by infrared radiation.

TABLE V

|  | Reference experiment AM # | | |
| --- | --- | --- | --- |
|  | 389 | 462 | 466 |
| Reaction pressure, p.s.i.g | 0 | 82 | 170 |
| Reaction time, min | 240 | 300 | 240 |
| Olefin type distribution of 400/700° F. ($C_{12}$-$C_{22}$) boiling range fraction: |  |  |  |
| Type I | 42 | 58 | 87 |
| Type II | 19 | 10 | 6 |
| Type III | 39 | 32 | 7 |
| Alkylate content of this fraction, mole percent | <5 | Tr. | Tr. |

EXAMPLE 9

In an experiment similar to Example 8 the effect of catalyst concentration in terms of grams $Et_3Al/100$ cc. of diluent was determined. The results are summarized in Table VI below.

TABLE VI

|  | Reference experiment AM # | |
| --- | --- | --- |
|  | 466 | 468 |
| Catalyst concentration as Et Alg./100 cc. histological xylene diluent | 0.210 | 0.110 |
| Reaction pressure, p.s.i.g | 170 | 170 |
| Olefin type distribution of the 400/700° F. ($C_{12}$-$C_{22}$) boiling range fraction: |  |  |
| Type I | 87 | 95 |
| Type II | 6 | 2 |
| Type III | 7 | 3 |
| Alkylate content of this fraction, mole percent | Tr. | Tr. |

The results indicate that the formation of linear alpha olefins (Type I) is favored by higher ethylene pressure (Example 7) and lower triethylaluminum concentrations (Example 8).

EXAMPLE 10

The experiment reported in Example 9 was compared with a number of ethylene polymerization process reported in the prior art. The results reported in Table VII below indicate the superiority of the instant invention for producing linear (Type I) alpha olefins.

TABLE VII

| Catalyst | Bestian et al [1] | Langer-White [2] | McConnel-Coover [3] | Antonsen [4] | Favis |
| --- | --- | --- | --- | --- | --- |
| Component: |  |  |  |  |  |
| #1 | Aluminum sesquichloride | Ethylaluminum sesquichloride | Ethylaluminum sesquichloride | EtAlCl$_2$ | Et$_3$Al. |
| #2 | Titanium tetrachloride |  |  | TiCl$_4$ | Cl-MCP. |
| #3 |  | TiCl$_4$ | Hexamethyl phosphoric triamide. | Diglyme | TiCl$_4$. |
| #4 |  |  |  |  | Ferrocene. |
| Diluent | Methylene chloride | Cl-Benzene | Cyclohexane | Lower aromatics | Lower aromatics. |
| Reaction temp., °F | −67 | 32 | 392 | 46 | 0. |
| Reaction pressure, p.s.i.g | Atmosphere | Atmosphere | 3,500 | 2–6 | 170. |
| Product distribution wt. percent on total product: |  |  |  |  |  |
| Total <$C_{24}$ olefin | 90 | 72 (<$C_{28}$) | 100 | 71 | 91. |
| $C_{12}/C_{22}$ olefin | 63 | 48 ($C_8$-$C_{29}$) |  | 58 | 43. |
| Type I, mole percent |  | 20 | n-1-olefins of ≤$C_{12}$ | Not reported [6] | 95. |
| Type II, mole percent |  | 20 |  | do | 2. |
| Type III, mole percent | ~100 | 60 |  | do | 3. |
| Type IV, mole percent |  |  |  | do |  |
| Non terminal $CH^3$ in chains |  | One [5] |  | do | Nil. |

[1] Ang. Chem., International edition, Vol. 2, No. 1, January 1963.
[2] U.S. 2,993,942.
[3] U.S. 3,096,385.
[4] U.S. 3,108,145.
[5] Near the middle.
[6] Probably Types II and III, Ind. Chem. Eng., Vol. 2, No. 3, p. 229 (Sept., 1963).

EXAMPLE 11

This example demonstrates an optimized form of the experiment demonstrated in the Example 9. To a five U.S. gallon stirred, nitrogen blanketed autoclave having a Pyrex glass-Teflon-carbon steel internal surfaces, 5800 cc. of xylene were introduced together with the catalyst. The latter was prepared at 60 to 70° F., by reacting 6.3 grams of triethylaluminum with monochlorinated methylcyclopentane, the molar ratio of this modifier to triethylaluminum being 1.73; this was further reacted with titanium tetrachloride and ferrocene using amounts corresponding to 0.468 and 0.112 mole per mole of triethylaluminum respectively. The temperature of the system was lowered to 10° F., which was the normal reaction temperature, and ethylene was continuously introduced to maintain a reaction pressure of 305 p.s.i.g. After 4 hours the reaction was voluntarily terminated. The reaction mixture was treated with water, under nitrogen atmosphere and room temperature to destroy catalyst. The hydrocarbon phase was filtered to remove a small amount of xylene insoluble products and the filtrate containing about 96.3 wt. percent of the total reaction product was analyzed by gas chromatography using a 10 ft. silicon gum rubber column. The total amount of recovered reaction product was 1197 grams. Table VIII gives the total product distribution, in wt. percent, per number of corresponding carbon atoms. An amount of 1.2 wt. percent of total product of aromatic alkylate, produced by the interaction of catalyst ingredients with the aromatic diluent, was omitted since its formation is not originated from the growth reaction proper. It will be seen that the reaction produced n-1-olefins of 98.2 wt. percent purity. The detergent range fraction of $C_{10}$ to $C_{22}$ olefin was obtained in 56.1 wt. percent yield and the $C_{12}$ to $C_{22}$ fraction in 42.9 wt. percent yield, both on total reaction product.

TABLE VIII.—TOTAL PRODUCT DISTRIBUTION PER NUMBER OF CARBON ATOMS

| | Weight percent on total reaction product |
|---|---|
| n-1-$C_4$ olefin | 7.9 |
| non-alpha | --- |
| n-1-$C_6$ olefin | 13.4 |
| non-alpha | 0.2 |
| n-1-$C_8$ olefin | 13.1 |
| non-alpha | 0.3 |
| n-1-$C_{10}$ olefin | 12.9 |
| non-alpha | 0.3 |
| n-1-$C_{12}$ olefin | 11.0 |
| non-alpha | 0.4 |
| n-1-$C_{14}$ olefin | 9.2 |
| non-alpha | 0.5 |
| n-1-$C_{16}$ olefin | 7.3 |
| non-alpha | 0.4 |
| n-1-$C_{18}$ olefin | 5.9 |
| non-alpha | 0.3 |
| n-1-$C_{20}$ olefin | 4.4 |
| non-alpha | 0.1 |
| n-1-$C_{22}$ olefin | 3.1 |
| non-alpha | 0.2 |
| n-1-$C_{24}$ olefin | 2.3 |
| non-alpha | 0.1 |
| n-1-$C_{26}$ olefin | 1.7 |
| non-alpha | 0.1 |
| n-1-$C_{28}$ olefin | 1.0 |
| non-alpha | trace |
| n-1-$C_{30}$ olefin | 0.6 |
| non-alpha | trace |
| n-1-$C_{32}$ olefin | 0.3 |
| xylene insoluble polyethylenes | 3.3 |
| Total | 100.3 |

EXAMPLE 12

Reaction time and product to diluent weight ratios are interrelated variables. A typical reaction carried out under the conditions of the experiment in the Example 11 was studied in this respect. Samples of the reaction mixture were received at various reaction times. They were hydrolyzed to destroy catalyst and in turn analyzed by gas chromatography using a 10 ft. silicon gum rubber column. The results are shown in the following table.

TABLE IX

| | Reaction Time, hr. | | | |
|---|---|---|---|---|
| | 1 | 2 | 3 | 4 |
| Diluent/product weight ratio | 10.6 | 6.8 | 5.7 | 4.6 |
| n-1-olefin content in the total reaction product, wt. percent [1] | 90.3 | 93.4 | 95.3 | 95.4 |
| Product distribution, wt. percent: | | | | |
| $C_4$ to $C_{10}$ fraction | 42.1 | 43.6 | 45.4 | 40.5 |
| $C_{12}$ to $C_{22}$ fraction | 51.1 | 49.3 | 47.6 | 52.4 |
| $C_{24}$+ fraction | 6.8 | 7.1 | 7.0 | 7.1 |
| Purity in n-1-olefin, wt. percent: | | | | |
| $C_4$ to $C_{10}$ fraction | 93.8 | 95.0 | 96.9 | 97.3 |
| $C_{12}$ to $C_{22}$ fraction | 87.1 | 93.1 | 94.1 | 94.1 |
| $C_{24}$+ fraction | 92.6 | 97.2 | 95.3 | 91.5 |

[1] Excluding 2-4 wt. percent high molecular weight polyethylenes. The balance of the non-alpha olefin is mainly Type II and Type III olefins divided in equal amounts.

It will be seen that during the course of the one to four hour reaction times where the xylene to product ratio decreased from 10.6 to 4.6, the n-1-olefin content of the total reaction product increased from 90.3 to 95.4 wt. percent respectively. Purity in n-1-olefin and product distribution was practically not affected by the reaction time. Actually purity in n-1-olefin was higher by 5% in the four hour sample than that of the one hour sample, probably because the concentration of the non-alpha olefin including several minor impurities in the reaction mixture is constant in relation with the reaction time. While this experiment shows that the reaction can be carried out for more than 4 hours, or to lower than 4.6 diluent to produce weight ratios, and still obtain an overall purity in n-1-olefin higher than 95%, optimum limits in this respect can be determined experimentally in a manner similar to that described in this example.

EXAMPLE 13

The effect of ferrocene catalyst component on product distribution was again checked, under the new critical reaction conditions of ethylene and catalyst concentrations, by comparing reactions carried out under the conditions of Example 8 in presence and absence of ferrocene. Results are shown in the following tabulation:

TABLE X

| | In presence of ferrocene, mole percent | In absence of ferrocene, mole percent |
|---|---|---|
| Olefin type distribution of the 400/700° F. boiling range fraction mole percent on total olefin: | | |
| Type I olefin | 92 | 62 |
| Type II olefin | 1 | 4 |
| Type III olefin | 2 | 9 |
| Type IV olefin | 5 | 25 |

It will be seen that in the absence of ferrocene the reaction gave a 400 to 700° F. boiling range fraction containing 62 mole percent n-1-olefin which was considerably lower than that of 92 mole percent contained in presence of ferrocene.

EXAMPLE 14

Since ethylene and catalyst concentrations are critical variables in the production of high purity n-1-olefins from ethylene, by modified Ziegler catalysts, a series of experiments were carried out at 0° F., 200 p.s.i.g., using various typical ethylene Ziegler type oligomerization catalysts, such as those composed of aluminum alkyl halides and titanium tetrachloride. Results are shown in Table XI. The data are also compared with those obtained by a typical triethylaluminum-monochlorinated methylcyclopentane-titanium tetrachloride-ferrocene catalyzed reaction (AM–510). It will be seen that the system diethylaluminum chloride-titanium tetrachloride-ferrocene (AM–511) gave predominantly xylene insoluble high molecular weight polymers. Substitution of ethylaluminum sesquichloride for diethylaluminum chloride (AM–514) resulted in the production of large quantities of xylene insoluble high molecular weight polymers. A small amount of 400/700° F. boiling range fraction containing 93 mole percent n-1-olefin was also recovered.

The ethylaluminum dichloride-titanium tetrachloride system catalyzed a reaction (AM–517) giving predominantly n-1-olefins of very low molecular weight, that is 71 wt. percent on total product materials having a carbon number smaller than 12, and 28 wt. percent $C_{12}$–$C_{22}$ olefins containing 82% n-1-olefin. In presence of ferrocene (AM–512) this system gave 54 wt. percent $C_4$ to $C_{10}$, and 37 wt. percent $C_{12}$–$C_{22}$ olefins, the latter containing 81 wt. percent n-1-alpha. While the results of these reactions were inferior to those obtained using a triethylaluminum-monochlorinated methylcyclopentane-titanium tetrachloride-ferrocene system (AM–510), it is clearly shown that the basic characteristics of this invention namely controlled ethylene concentration and/or presence of ferrocene in the reacting system, benefit the formation of products predominantly composed of n-1-olefins.

TABLE XI

| | Experiment AM # | | | | |
|---|---|---|---|---|---|
| | 510 | 511 | 514 | 517 | 512 |
| Type of aluminum alkyl | Et₃Al [7] | Et₂AlCl | Et-Al sesquichloride [6] | EtAlCl₂ | EtAlCl₂ |
| Amount g./100 cc. xylene | .106 | 0.112 | 0.223 | 0.117 | 0.117 |
| TiCl₄/alum alkyl mole ratio | .47 | 0.47 | 0.24 | 0.47 | 0.47 |
| Ferrocene/alum. alkyl mole ratio | .112 | 0.109 | 0.55 | Zero | 0.109 |
| Product distribution, wt. percent [1]: | | | | | |
| 300/400° F. boiling range fraction | [8] 40 | | | [8] 71 | 54 |
| 400/700° F. boiling range fraction | 49 | | | 28 | 37 |
| 700° F. plus fraction | 7 | | | 1 | 2 |
| Xylene insolubles | 4 | ([2]) | ([2]) | Nil | 75 |
| Olefin Type (IR), mole % in the 400/700° F.[3], [4], [5]: | | | | | |
| Type I | 93 | | 93 | 82 | 81 |
| Type II | | | 3 | | |
| Type III | | | 4 | | |
| Remarks | ([9]) | ([10]) | ([11]) | ([9]) | ([9]) |

[1] Rough determination.
[2] Large quantities—Above 20 wt. percent on total product.
[3] Excluding type IV and V olefins.
[4] An analogous olefin type distribution should be expected for the other fractions.
[5] Product distribution and n-1-olefin concentration were determined by gas chromatography.
[6] Refers to the monomer aluminum alkyl.
[7] Modified with monochlorinated methylcyclopentane-molar ratio to triethylaluminum 1.73.
[8] C₄ to C₁₀ carbon range.
[9] Gas chromatography data.
[10] Very large quantities of xylene insoluble products were formed.
[11] Strong band at 12.2 microns.

EXAMPLE 15

While treatment of the reaction mixture with water removed catalyst decomposition products, a considerable amount of ferrocene, remained in the hydrocarbon phase and impaired product appearance. Ferrocene can easily and inexpensively be removed by oxidation with various oxidants such as hydrogen peroxide plus hydrogen chloride, or by 3N+nitric acid or by treatment with appropriate adsorbants such as silica gel, clay, etc., at 70° F. as shown in the following tabulation:

TABLE XII

| Type of treatment [1] | Iron concentration, p.p.m. | Transmittance percent at 425 millimicrons, 5 cm. cell-water 100% |
|---|---|---|
| None | 432 to 454 | 1.0 |
| 3N, HNO₃ [2] | 1.8 to 2.3 | 83.0 |
| 3N, HNO₃ plus silica gel [2] | Nil | 98.0 |
| H₂O₂ plus HCl [2] | | 85.0 |
| 5N, HNO₃ | | 86 |
| Commercial n-1-olefins (Humphrey Wilkinson) | | 95.0 |

[1] Oxidized ferrocene is soluble in water.
[2] A stoichiometric to iron concentration oxidant consumption is equired.

Having thus described the general nature as well as the specific embodiments of the instant invention the true scope will now be pointed out by the appended claims.

What is claimed is:

1. A process for preparing a reaction product mixture containing a high concentration of linear alpha olefin polymers which comprises polymerizing an ethylene-containing gas in the presence of a minor amount of a catalyst comprising (1) a compound selected from the group consisting of alkyl and alkyl halide compounds of a metal selected from Groups I–III of the Periodic Table, (2) an inorganic halide of a metal selected from the groups consisting of titanium, zirconium, vanadium, chromium, molybdenum, tungsten and iron and, (3) a material selected from the group consisting of tertiary alkyl halides and alkyl halocyclopentanes wherein the alkyl group contains from 1 to 10 carbon atoms, the quantity of alkyl halocyclopentanes being maintained lower than about 0.99 mole per mole of alkyl radical of the metal alkyl compound, in an inert aromatic hydrocarbon diluent at a temperature in the range of $-130°$ F. to $+130°$ F. and a pressure in the range of 100 to 2000 p.s.i.g.

2. A process for preparing a reaction product mixture containing a high concentration of linear alpha olefin polymers which comprises polymerizing an ethylene-containing gas in the presence of a minor amount of a catalyst comprising (1) a compound selected from the group consisting of alkyl and alkyl halide compounds of a metal selected from Groups I–III of the Periodic Table, (2) an inorganic halide of a metal of Groups IV–B, V–B, VI–B and VIII of the Periodic Table, (3) a material selected from the group consisting of tertiary alkyl halides and alkyl halocyclopentanes wherein the alkyl group contains from 1 to 10 carbon atoms, and (4) a metallocene, in an inert aromatic hydrocarbon diluent at a temperature in the range of $-130°$ F. to $+130$ F. and a pressure in the range of 100–2000 p.s.i.g.

3. The process of claim 2 wherein said inert hydrocarbon diluent is xylene.

4. The process of claim 2 wherein catalyst component (1) is an alkyl aluminum compound.

5. The process of claim 2 wherein catalyst component (2) is a titanium halide.

6. The process of claim 2 wherein catalyst component (3) is methylchlorocyclopentane.

7. The process of claim 2 wherein catalyst component (1) is ethyl aluminum dichloride and catalyst component (2) is titanium tetrachloride.

8. A process for preparing reaction product mixture containing a high concentration of linear alpha olefin polymers in the range of $C_{12}$ to $C_{22}$ which comprises polymerizing an ethylene-containing gas in the presence of a catalyst consisting essentially of an alkylaluminum compound, a titanium halide, methylchlorocyclopentane and ferrocene is an aromatic hydrocarbon diluent at a temperature in the range of $-40°$ to $+70°$ F. and a pressure in the range of 100 to 500 p.s.i.g.

9. The process of claim 8 wherein said aromatic hydrocarbon diluent is xylene.

10. The process of claim 8 wherein the reaction time is in the range of 0.1 to 3 hours.

11. The process of claim 8 wherein said alkylaluminum compound is triethylaluminum and said titanium halide is titanium tetrachloride.

References Cited

UNITED STATES PATENTS

| 2,907,805 | 10/1959 | Bestian et al. |
| 2,969,408 | 1/1961 | Nowlin et al. |
| 3,134,824 | 5/1964 | Walker et al. |
| 3,321,546 | 5/1967 | Roest et al. |
| 3,334,079 | 8/1967 | Raich _____ 252—429 X |

PAUL M. COUGHLAN, JR., Primary Examiner

U.S. Cl. X.R.

252—429